United States Patent [19]

Albach

[11] Patent Number: 5,612,856
[45] Date of Patent: Mar. 18, 1997

[54] CIRCUIT ARRANGEMENT FOR PRODUCING A DIRECT VOLTAGE WITH REDUCTION OF HARMONIC AND HIGH-FREQUENCY INTERFERENCES

[75] Inventor: Manfred Albach, Aachen, Germany

[73] Assignee: U.S. Philips Corporation, New York, N.Y.

[21] Appl. No.: 567,730

[22] Filed: Dec. 5, 1995

Related U.S. Application Data

[63] Continuation of Ser. No. 342,296, Nov. 18, 1994, abandoned.

[30] Foreign Application Priority Data

Nov. 19, 1993 [DE] Germany ............... 43 39 451.5

[51] Int. Cl.$^6$ ............... H02M 3/335; H02M 5/42
[52] U.S. Cl. ............... 363/20; 363/89
[58] Field of Search ............... 363/16, 20, 39, 363/44–48, 89, 90, 125, 127; 323/222, 282

[56] References Cited

U.S. PATENT DOCUMENTS

| | | | |
|---|---|---|---|
| 4,700,083 | 10/1987 | Raets ............... | 307/253 |
| 4,712,169 | 12/1987 | Albach ............... | 363/89 |
| 4,821,166 | 4/1989 | Albach ............... | 363/89 |
| 5,107,411 | 4/1992 | Misdom ............... | 363/20 |
| 5,148,360 | 9/1992 | Nguyen ............... | 363/48 |
| 5,363,287 | 11/1994 | Liu et al. ............... | 363/20 |
| 5,410,466 | 4/1995 | Maehara ............... | 363/98 |
| 5,440,475 | 8/1995 | Russell et al. ............... | 363/45 |

FOREIGN PATENT DOCUMENTS

| | | |
|---|---|---|
| 0223315 | 5/1987 | European Pat. Off. . |
| 3537536 | 4/1987 | Germany . |
| 2261331 | 5/1993 | United Kingdom . |

OTHER PUBLICATIONS

"Schaltnetzteile in Der Praxis" Otmar Kilgenstein.
"Schaltnetzeile" W. Hirschmann (Siemens).
"Snubber Circuits: Theory, Design and Application" Philips C. Todd, in Unitrode Switching Regulated Power Supply Design Manual May 1993.

*Primary Examiner*—Matthew V. Nguyen
*Attorney, Agent, or Firm*—Laurie E. Gathman

[57] ABSTRACT

A description is given of a circuit arrangement for producing at least an output direct voltage (at 18, 19) from an at least significantly sinusoidal input a.c. voltage (at 2, 3) of a first frequency, comprising a first rectifier device (1), to which the input a.c. voltage (at 2, 3) can be applied and from which from a direct voltage output (4, 5) a rectified voltage can be taken, a first inductance (6), a second rectifier device (7) and a first filter capacitor (8), which, interconnected in the above sequence, form a series arrangement arranged in parallel with the direct voltage output (4, 5), a switched-mode power supply (9) having two input terminals (10, 11) arranged parallel to a first filter capacitor (8) and between which there is a series arrangement including a second inductance (12) and a switching device (13), a second frequency can alternately be switched to the conductive and the non-conductive state and from which the output direct voltage(s) (at 18, 19) can be supplied, the junction point (22) between the first inductance (6) and the second rectifier device (7) is linked to the junction point (24) between the second inductance (12) by a control capacitor and the switching device (13), the first inductance (6) and the control capacitor (23) being rated such that a resonant frequency determined thereby exceeds the second frequency and the latter is chosen to be high compared to the first frequency. Thereby, with little design effort and cost for the components both the voltage increase at the switching device and consequently the high-frequency interferences originating therefrom and also the harmonics of the mains current are reduced.

7 Claims, 2 Drawing Sheets

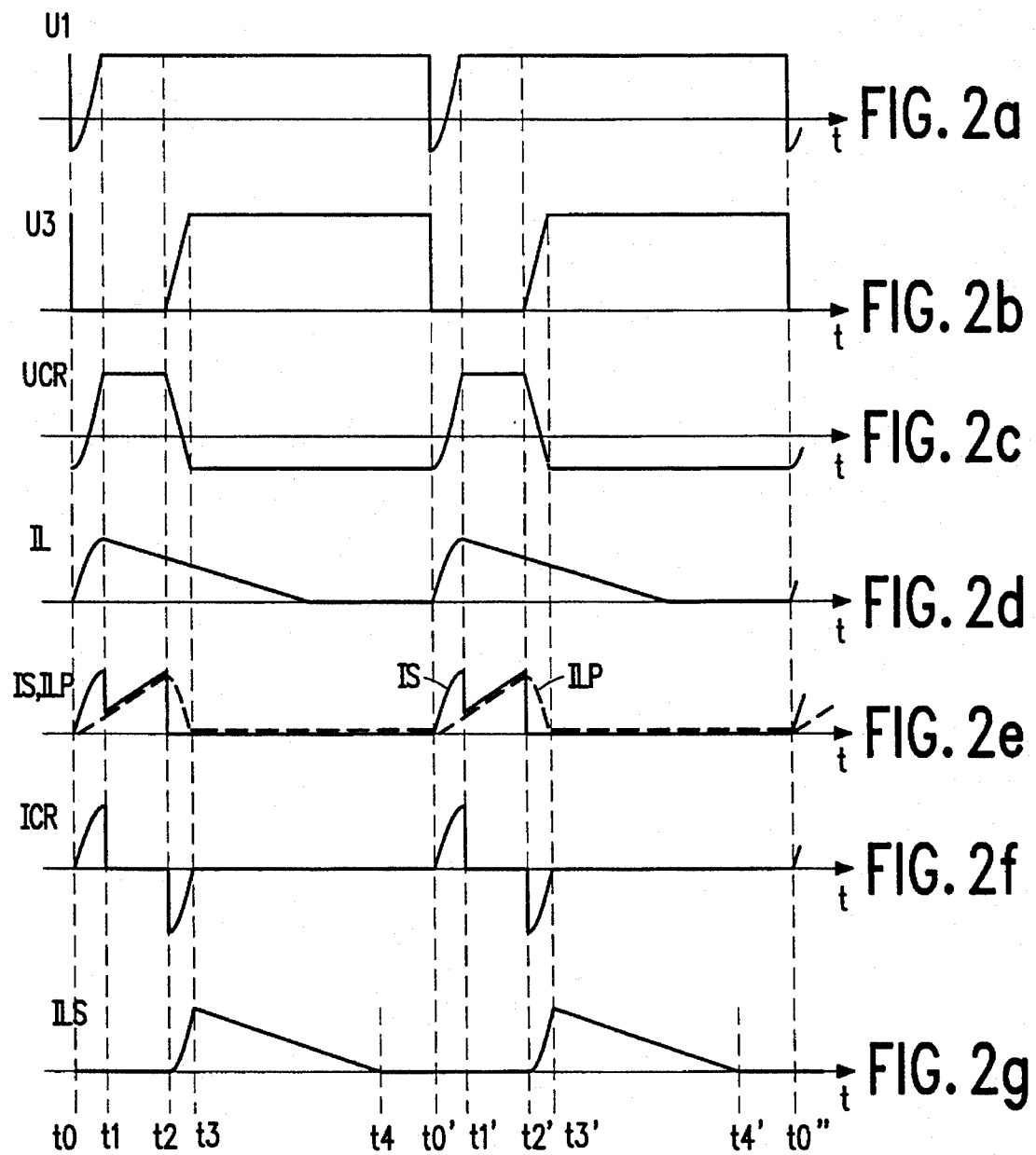

CIRCUIT ARRANGEMENT FOR PRODUCING A DIRECT VOLTAGE WITH REDUCTION OF HARMONIC AND HIGH-FREQUENCY INTERFERENCES

This is a continuation of U.S. patent application Ser. No. 08/342,296, filed Nov. 18, 1994 now abandoned.

BACKGROUND OF THE INVENTION

The invention relates to a circuit arrangement for producing at least an output direct voltage from an at least significantly sinusoidal a.c. voltage.

Circuit arrangements of this type are basically known from the monograph "Schaltnetzteile in der Praxis" by Otmar Kilgenstein. In this treatise a sinusoidal mains a.c. voltage is first converted, with the aid of a bridge rectifier and a storage capacitor into a direct voltage, which is then used as the input voltage for a switched-mode power supply which produces one or a plurality of output direct voltages. These voltages can be electrically insulated from or d.c. coupled to the mains a.c. voltage. A considerable disadvantage of this prior art is the fact that electro-magnetic interferences are formed, both in the range of switching frequencies and their harmonics, i.e. consequently at relatively high frequencies, and also in the range of the mains frequency, i.e. in the low frequency range. In the latter case a significant distortion of the currents taken from the mains becomes noticeable in a very disturbing manner.

A further problem to be considered in switched-mode power supplies of the above prior art is that switching losses occur at high-frequency switches of the switched-mode power supply. These switching losses which increase versus the increase in the switching frequency, result in an impermissible, thermal load of more specifically the high-frequency switch and are an obstacle to an increase of the switching frequency to above a limit set by this thermal load. An increase of the switching frequency is on the other hand very desirable, for example for reducing the magnetic components of the switched-mode power supply.

From the monograph "Schaltnetzteile" by W. Hirschmann (Siemens) it is known, for the purpose of reducing distortions of the currents taken from mains, i.e. for reducing the harmonics of the mains frequency in the curent taken from mains, to connect the switched-mode power supply directly to the bridge rectifier, which is fed from mains, without the intermediacy of a filter capacitor. By controlling in a corresponding manner, the turn-on and turn-off moments, respectively, of the high-frequency clocked switch in the switched-mode power supply a current which is at least to a significant extent free from harmonics and varies sinusoidally versus the mains frequency can be taken from mains. This circuit has however the disadvantage that the power absorbed by it has in addition to a constant pan also a part which fluctuates at twice the mains frequency. On the one hand this has for its consequence that the components of the switching arrangement must be overrrated according to the fluctuations of the power absorbed between zero value and twice the mains output power, which leads to a significantly higher costs. This overrating applies more in particular to the transformer provided in the switched-mode power supply. On the other hand, an oscillation of twice the mains frequency is superposed on the output direct voltage of the circuit arrangement of this design. Therefore, in many cases the circuit arrangement must be followed by a further stabilizing circuit which may include a linear control or a further switching regulator. This also raises the design effort and the costs of the circuit arrangement to a significant extent.

The EP-B1-0 223 315 discloses a circuit arrangement for producing a direct voltage from a sinusoidal input voltage, by which the noise voltages at lower frequencies are reduced. The known circuit arrangement includes for that purpose a switched-mode power supply comprised of a diode, a coil, a capacitor and a transistor, to which via a rectifier a basically sinusoidal input voltage is applied and whose elements are arranged such, that in the conductive state of the transistor the diode is non-conductive and the coil current flows at least via the transistor and in the non-conductive state via the diode and a parallel circuit formed by a load and the capacitor. In a pulse generator switching pulses for the transistor are produced, from the input voltage, whose frequency changes monotonously versus time between a minimum frequency when the rectified input voltage has its maximum value, and a maximum frequency at the minimum value. In this situation the load may include a (further) switched-mode power supply, via which the end user is fed. Consequently, a switched-mode power supply which does not provide an electrical insulation is connected in this circuit arrangement between the rectifier and the capacitor. This (further) switched-mode power supply is preferably constituted by an up-converter, by means of which a sinusoidal current can be taken from mains and which simultaneously produces a voltage across the capacitor which exceeds the peak of the mains a.c. voltage. Consequently, the subsequent switched-mode power supply inside the load, which likewise includes a transformer, can be rated for the means output power, as no power peaks occur any more. As this (further) switched-mode power supply is fed with a high input voltage, the currents occurring therein and consequently also the associated ohmic losses are relatively low there. However, the reduced circuit cost and design effort obtained for the (further) switched-mode power supply is offset by the additional cost and design effort for the up-converter, which as described basically comprises a coil, a free-running diode and a high frequency-operated switch with matching drive circuit.

From the DE-OS 35 37 536 or from the article "Snubber Circuits: Theory, Design and Application" by Philip C. Todd, published in "Unitrode Switching Regulated Power Supply Design Manual", May 1993, attenuators (so-called snubber or voltage clamps) are known, by means of which an attenuation, beset with losses, of flyback pulses at high-frequency switches can be effected. Circuits of this type can more specifically be used to reduce high-frequency interferences, as they limit the rise time of the cut-off frequency at the high-frequency switch. Namely, the faster the voltage at the high-frequency switch can rise on switching to the non-conductive state, the greater the capacitive noise currents flowing in the capacitances always present in the region of the high-frequency switch, for example between a terminal of the high-frequency switch and ground. If such interferences are not previously damped, then expensive mains filters may possibly be required to suppress them. More in particular, interferences of this type may occur at switched-mode power supplies in monitors or television sets, but also in other, comparably sensitive devices, as there they can, for example, become visible as interferences in the picture.

But also the attenuators described form an additional circuit design effort and cost. The design effort and cost becomes particularly high when the described, known measures to suppress the low-frequency noise and the high-frequency noise must be used in combination in a current supply circuit.

SUMMARY OF THE INVENTION

The invention has for its object to form a circuit arrangement of the type defined in the opening paragraph in such a manner, that on the one hand with little cost and design effort, the increase in voltage (i.e. the rise rate of the voltage) at the high-frequency switch of the switched-mode power supply and consequently interferences and switching losses at high frequencies are reduced and simultaneously a to the best possible extent sinusoidal current is taken from the mains, so that the harmonics of this mains current and consequently the low-frequency interferences are reduced by the circuit arrangement.

According to the invention, this object is accomplished by a circuit arrangement for producing at least an output direct voltage from an at least significantly sinusoidal input a.c. voltage of a first frequency, comprising a first rectifier device, to which the input a.c. voltage can be applied and from which at a direct voltage output a rectified voltage can be taken, a first inductance, a second rectifier device and a first filter capacitor, which, interconnected in the above sequence, form a series arrangement arranged in parallel with the direct voltage output, a switched-mode power supply having two input terminals by means of which it is arranged parallel to a first filter capacitor and between which there is a series arrangement including a second inductance and a switching device, which by means of a second frequency can alternately be switched to the conductive and the non-conductive state and from which the output direct voltage(s) can be supplied, as well as a control capacitor by means of which the junction point between the first inductance and the second rectifier device is linked to the junction point between the second inductance and the switching device, the first inductance and the control capacitor being rated such, that a resonant frequency determined thereby exceeds the second frequency and the latter is chosen to be high compared to the first frequency.

In the circuit arrangement in accordance with the invention the control capacitor assumes both the function of the up-converter to reduce the low-frequency distortions in the mains current and the function of the attenuation of the high-frequency interferences from the switching device, more specifically the attenuation of the rise in voltage across the switching device at the transition to the non-conductive state. Compared to the known dissipating attenuation members, ohmic losses do also not occur in the circuit arrangement of the invention, so that heating of the circuit arrangement is reduced and its efficiency is increased. This also has an advantageous effect for the rating of the further components of the circuit arrangement in accordance with the invention.

The invention also solves in a circuit-technically very simple manner the problem, that on the one hand the duty cycle of the switching device is determined in the switched-mode power supply by the output power to be transmitted therefrom, whereas in the up-converter in accordance with EP-B1-0 223 315 the duty cycle of the switching transistor used therein is determined by the required, sinusoidal mains current and consequently evidences a variation within the half-waves of the mains voltage and the mains current, respectively, which is different from that of the duty cycle of the switching device in the switched-mode power supply. The required turn-on period of the switching transistor in the up-converter may be significantly shorter than the turn-on period in the switching device of the contiguous switched-mode power supply (in the load 14 in FIG. 1 of the EP-B1-0 223 315). The circuit arrangement in accordance with the invention now however ensures that the increase of the current in the first inductance can be limited independently of the turn-on period of the switching device in the switched-mode power supply, as the first inductance is not directly connected to the switching device, but indirectly across the control capacitor. This has for its result that the maximal energy to be taken up by the first inductance in each high-frequency switching cycle of the switching device can be controlled by the energy previously stored in the control capacitor. So as to now to obtain the two goals—the sinusoidal mains current and the output-dependent operation of the switching device simultaneously with the circuit arrangement in accordance with the invention, the control capacitor must be fully switched-over within a high-frequency switching cycle of the switching device between a first, positive voltage value and a second, negative voltage value. Because of the rating of the second, negative voltage value, the fluctuation in the mains current can be improved in that sense, that the low-frequency interferences and distortions, respectively, are reduced, and by the rating of the first, positive voltage value, which corresponds to the voltage at the first filter capacitor, it is ensured that when the switching device is switched-off, the rate of the voltage rise across the switching device is reduced to such a low value, that thereby on the one hand more specifically the high-frequency interferences are decreased and on the other hand also the switching losses are reduced.

The above-mentioned condition is more in particular satisfied in the circuit arrangement in accordance with the invention by the described rating of the resonant frequency determined by the control capacitor and the first inductance. It is then at the same time possible, that during a fraction of the turn-on period of the switching device and also during a fraction of the switch-off period of the switching device, the control capacitor can be fully switched-over. The switch-over period is consequently not coupled to the duty cycle between the turn-on period and the turn-off period of the switching device. Therefore this duty cycle can be set independently of the described switching procedure in the control capacitor and can consequently be set in accordance with the transmitted power.

The complete switch-over of the control capacitor additionally provides that the rise rate of the voltage at the switching device is limited in the said manner when this device changes to the non-conductive state.

The circuit arrangement of the invention has therefore the advantage, that both the switching losses and also the high-frequency interferences can be reduced at a simultaneous reduction of the low-frequency distortions of the current taken from mains and that therefor both the control capacitor and the first inductance can be rated at a very low value.

These advantages become very great, if, in accordance with a further elaboration of the invention, the resonant frequency is chosen to be high compared to the second frequency.

In accordance with a further elaboration of the invention, the second inductance may be in the form of a primary winding of a transformer having at least one secondary winding, the output direct voltage(s) being derivable from the second winding(s). Using such an arrangement, an electrical separation between the input a.c. voltage and the output direct voltage(s) is possible. If such an electrical insulation is not required, the transformer may alternatively be formed by an autotransformer.

According to the invention, the first inductance can be rated very low. Preferably it is of such a low rating, that a current which starts to flow through the first inductance when the switching device is switched-on has already decayed again before the beginning of the subsequent triggering of the switching device when it operates with a value for the second frequency, to which this output power provided for supplying the output direct voltage(s) can be adjusted. This ensures that the current in the first inductance decreases to zero at such a correct instant, that when the switching device is switched-on, the second rectifier device has already been inhibited. Then no reverse-recovery currents can flow through the switching device and the control capacitor from the first filter capacitor because of the second rectifier device which is then still in the conducting state.

Thus, because of the low rating of the first inductance, it is also achieved that advantageously the second frequency can be adjusted proportionally to the power supplied with the output direct voltage(s).

In accordance with a still further, advantageous elaboration of the invention a third rectifier device having a current flow direction corresponding to the second rectifier device is inserted in the connection between the second rectifier device and the first filter capacitor on the one hand and the associated input terminal of the switched-mode power supply on the other hand. Using this third rectifier device it is additionally possible to prevent the control capacitor from discharging after the switching device has been switched-off, after the control capacitor has been charged to the second, negative voltage value.

The second, negative voltage value across the control capacitor can be controlled by the second inductance, which in the case the switched-mode power supply includes with a transformer is formed by the stray inductance of the primary winding thereof. The amount of this second, negative voltage value is greater than the output direct voltage transformed with the transformation ratio of the transformer. With this second, negative voltage value the harmonics of the low-frequency currents, supplied with the input a.c. voltage as well as the voltage across the first filter capacitor are influenced.

If after the switching device has been switched-off, the energy in the second inductance has fallen off, then, if the second inductance is in the form of a transformer, likewise no current flows anymore in its secondary winding, and the voltage at the second inductance, i.e. at the transformer, also becomes zero. Discharging of the control capacitor is also now prevented by the third rectifier device. So, depending on the desired second frequency or the desired duty cycle, respectively, gaps in the current can be permitted, that is to say between, for example, the decay of the current in the secondary winding and the renewed switch-on of the current in the second inductance a currentless time interval may be inserted. This also enables what is commonly called an on-off operation. This also supports the use of the circuit arrangement in accordance with the invention with any, i.e., for example, also with a constant, second frequency independently of the output power.

In accordance with a further elaboration, the circuit arrangement of the invention may include a voltage limiter stage arranged parallel to the switching device. This stage is preferably in the form of a state of the art attenuation circuit.

BRIEF DESCRIPTION OF THE DRAWINGS

An embodiment of the circuit arrangement in accordance with the invention is shown in the drawing and will be described hereafter in greater detail.

Therein:

FIG. 1 is a basic circuit diagram of the embodiment in accordance with the invention and FIGS. 2a–2g show the variation versus time of some currents and voltages in the circuit arrangement of FIG. 1.

DETAILED DESCRIPTION OF THE PREFERRED EMBODIMENTS

Figure 1:
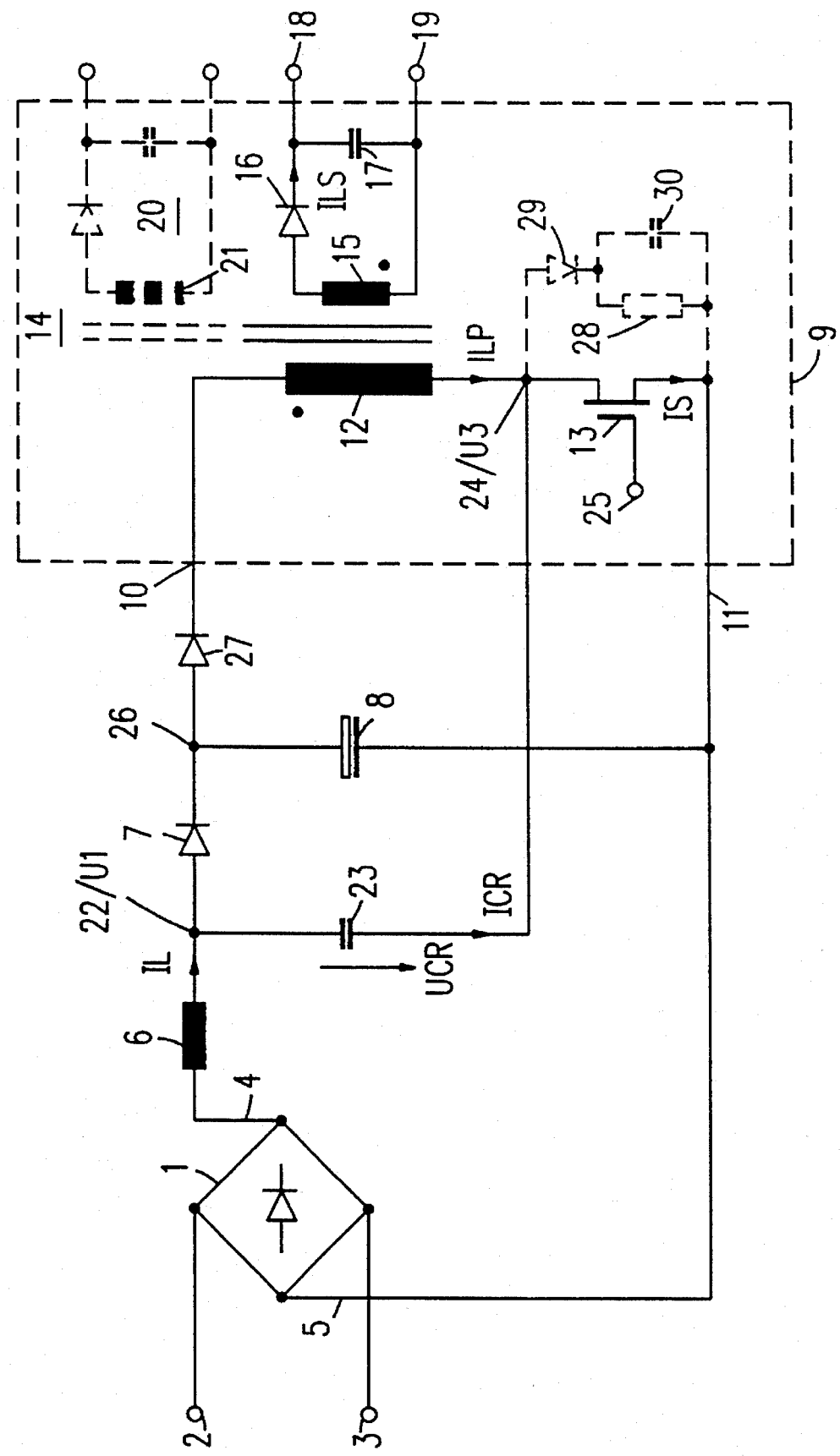

The circuit arrangement shown in FIG. 1 includes a first rectifier device 1, which is constituted by a bridge rectifier and is connectable by means of its a.c. voltage terminals 2, 3 to a power supply mains, from which it is fed with an at least significantly sinusoidal input a.c. voltage of a first frequency. A voltage rectified from the input a.c. voltage can be taken from two terminals 4, 5 which form a direct voltage output. Arranged between the terminals 4 and 5 of the direct voltage output of the first rectifier device and connected thereto there is a series arrangement formed by a first inductance 6, a second rectifier device 7 forming a free-running diode, and a first filter capacitor 8 formed by an electrolytic capacitor, the said above elements being connected in the enumerated sequence and the second rectifier device 7 being poled in the forward direction for the rectified voltage at the terminals 4, 5. A switched-mode power supply 9 has its two input terminals 10, 11 arranged in parallel to the first filter capacitor 8. The switched-mode power supply 9 includes, arranged between its input terminals 10, 11 a series arrangement of a second inductance 12 and a switching device 13, which in FIG. 1 is represented as a field-effect transistor, but which may alternatively be of a different construction type.

In the present example the second inductance 12 of the switched-mode power supply constitutes the primary winding of a transformer 14, whose secondary winding 15 feeds via a fourth rectifier device 16 a second filter capacitor 17, which is connected to two output terminals 18, 19 from which an output direct voltage can be taken.

The present embodiment, which is to be preferred, is shown as having an output circuit formed by the secondary winding 15 of the transformer 14, the fourth rectifier device 16 and the second filter capacitor 17, but may however also be provided with a plurality of output circuits for supplying a plurality of output direct voltages, as is shown by means of the broken-line, further output circuit 20, which is connected to a further secondary winding 21 of the transformer 14. In this arrangement the output direct voltages are electrically separated from the input a.c. voltage. If such an electrical separation is not required, the transformer 14 may alternatively be in the form of an autotransformer.

The junction point 22 between the first inductance 6 and the second rectifier device 7 is linked to the junction point 24 between the second inductance 12 and the switching device 13 via a control capacitor 23. This control capacitor 23 determines with the first inductance 6 a resonant frequency which is rated higher by a corresponding rating of the first inductance 6 and the control capacitor 23 than a second frequency, with which via a control terminal 25 the switching device 13 can be driven alternately to the conductive and the non-conductive state, respectively. In this situation this second frequency is high compared to the first frequency of the input a.c. voltage. Preferably, also the resonant frequency is chosen to be high compared to the second frequency, so that both the first inductance 6 and the control capacitor 23 can be rated correspondingly low. In addition to a compact structure this has also advantages as regards operation, as will be explained hereinafter.

Between the junction point 26, in which the second rectifier device 7 is connected to the first filter capacitor 8, and the first input terminal 10 of the switched-mode power supply 9 there is further arranged in the embodiment shown in FIG. 1 a third rectifier device 27; which is, for example, of a similar construction as the second rectifier device 7 (free-running diode) and is also arranged with the same direction of current flow relative to a current flow from the first inductance 6 to the second inductance 12.

For a working example of the circuit arrangement of FIG. 1, FIGS. 2a–2g show schematically the variation versus time of some currents and voltages. In FIG. 2a) the voltage U1 at the junction point 22, in FIG. 2b) the voltage U3 at the junction point 24 and in FIG. 2c) the voltage UCR at the control capacitor 23 are plotted versus the time t. FIG. 2d) shows the current IL through the first inductance 6, FIG. 2e) shows the variation, by means of a solid line, of the current IS through the switching device 13 and—by means of a broken line—the variation of the current ILP through the second inductance 12, i.e. the primary winding of the transformer 14. In FIG. 2f) the current ICR through the control capacitor 23 and in FIG. 2g) the current IL through the secondary winding 15 and the rectifier device 16 connected thereto are shown versus the time t. With this current ILS the energy from the transformer 14 is applied to the second filter capacitor 17 and consequently ultimately to the output terminals 18, 19 of the switched-mode power supply 9.

The function of the embodiment shown in FIG. 1 will now be described with reference to the diagrams of FIG. 2. At the instant t0 the switching device 13 is switched to its conductive state. In response thereto a current IL flows from the first a.c. voltage terminal 2 via the first inductance 6, the control capacitor 23, the switching device 13 and back via the first rectifier device 1 to the second a.c. voltage terminal 3. In the first moment after the instant t0 the currents ICR through the control capacitor 23 and IS through the switching device 13 are therefore basically identical to the current IL through the first inductance. The first inductance 6 and the control capacitor 23 then form a resonant circuit, so that the current assumes a sinusoidal shape having a frequency which is determined by the resonant frequency obtained from the rating of the first inductance and the control capacitor. This resonant frequency of the first inductance 6 and of the control capacitor 23 is rated such, that the control capacitor 23 is completely changed-over up to the instant t1. The instant t1 is then, because of the relative rating of the said resonant frequency and the second frequency, by which the switching device 13 is switched, still within the time interval in which the switching device 13 is in any case conductive. The control capacitor 23 is charged positively—starting from its initial voltage. At the instant t0 the voltage UCR at the control capacitor 23 assumes a negative value. In response to the resonance with the first inductance 6 a voltage increase is produced at the control capacitor 23. In normal operation the voltage UCR reaches at the control capacitor 23 the value of the voltage to which the first filter capacitor 8 has been charged. At that instant, at which the voltage UCR reaches the value of the voltage at the first filter capacitor 8, the second rectifier device 7 (free-running diode) becomes conductive and the current ICR resulting from the described resonance procedure and flowing through the control capacitor 23 and the switching device 13 is abruptly interrupted. In FIG. 2 this occurs at the instant t1. The energy stored in the meantime in the first inductance 6 corresponding to the current IL build-up therein so far, is now additionally applied to the first filter capacitor 8. In response thereto the current IL through the first inductance decreases linearly from instant t1 onwards.

Simultaneously, independently of the above-described procedure, a second procedure takes place. During the turn-on period of the switching device 13 a linearly increasing current ILP flows from the first filter capacitor 8 through the second inductance 12, i.e. through the primary winding of the transformer 14, and the switching device 13, also starting at the instant t0. This current, shown by means of a broken line in FIG. 2e) takes energy from the first filter capacitor which is stored in the transformer 14. The fourth rectifier device 16 in the output circuit at the secondary winding 15 of the transformer 14 is in this period without current, i.e. the current ILS has zero value, cf. FIG. 2g).

At the instant t2 the switching device 13 is changed-over to its non-conductive state, which is triggered by a corresponding signal at its control terminal 25. In contrast to the circuit arrangement known from the present state of the art, the voltage U3 at the junction point 24 and consequently across the switching device 13 now increases with a jump. This is caused by the fact that the current ILP now does not flow through the switching device 13 but rather through the control capacitor 23 and the second rectifier device 7, (free-running diode) and also through the third rectifier device 27. Depending on the magnitude of the current ILP through the second inductance 12 at the instant t2 and depending on the magnitude of the control capacitor 23 the voltage UCR can now be reduced with a highly limited chronological variation. In the diagrams of FIG. 2 this occurs in the time interval between the instants 12 and 13. This mode of operation of the circuit arrangement in accordance with the invention has two substantial advantages. On the one hand, because of the slowed-down voltage increase at the switching device 13, the switching losses produced in this device are reduced, on the other hand the capacitive noise voltage—alternatively denoted common-mode interference—between the junction point 24 and the second input terminal 11 of the switched-mode power supply 9 is greatly reduced; the latter more in particular then when—as is common practice—the second input terminal 11 is connected to chassis and possibly furthermore that terminal of the switching device 13 that is connected to the junction point 24 has a high parasitic capacitance, for example by providing it with a large cooling member. The energy stored in the leakage inductance of the transformer 14 is not eliminated in the circuit arragement of the invention by (ohmic) losses, but is relocated in the control capacitor 23. As at this instant the second and the fourth rectifier devices 7 and 27 are conductive, the voltage at the second inductance corresponds to the voltage UCR at the control capacitor 23. Not until this voltage has reached an adequately high negative value, also the fourth rectifier device 16 is changed to its conductive state. The energy from the transformer 14 is then transferred via its secondary winding 15 by means of the current ILS through the fourth rectifier device 16 into the second filter capacitor 17 and is consequently available at the output terminals 18, 19. As a result thereof also the energy in the transformer 14 is reduced. The current ILS in the secondary winding 15 then decreases linearly. This procedure takes place between the instants which in FIG. 2 are denoted by the references t3 and t4.

As is also shown in the diagrams of FIG. 2 between the instants t2 and t3, at the start of the current flow in the secondary winding 15, i.e. at the start of the flow of the current ILS, the current in the second inductance 12, i.e. the primary winding of the transformer 14, is not suddenly interrupted. On the contrary, this current in the primary winding flows still further and continuous to charge the control capacitor 23 negatively for such a long time, until the total energy from the leakage inductance of the primary winding of the transformer has fully disappeared, i.e. is relocated in the control capacitor 23. In response thereto the amount of the negative value for the voltage UCR becomes higher than the output voltage transformed on the primary side of the transformer 14, that is to say the output direct voltage between the output terminals 18 and 19. So as now to prevent the discharge of the control capacitor 23 on the voltage at the primary side of the transformer 14 and oscillations linked with this discharge, the third rectifier device 27 is inserted. It may namely happen that the second rectifier device 7 is at this instant still kept in the conductive state by a current IL in the first inductance 6 which has not yet decayed. This is also shown in FIG. 2d) at the instant t3. The third rectifier device 27 prevents in this position the occurrence of a positive current ICR. Up to the beginning of a subsequent switching cycle of the switching device 13, i.e. up to the instant t0' in FIG. 2, the control capacitor 23 retains the then obtained, negative value for the voltage UCR.

At the instant t4 in FIG. 2 the fourth rectifier device 16 becomes currentless, i.e. the current ILS has decayed to zero. The energy from the transformer 14 has been fully transferred thereby to the second filter capacitor 17. The primary winding 12 and the secondary winding 15 of the transformer 14 consequently carry no voltage. Also now the control capacitor 23 cannot discharge via the primary winding 12, since such a current flow is prevented by the third rectifier device 27 is prevented. The currentless state of the transformer 14 can therefore be maintained up to the start of the subsequent switching period at the instant t0' in FIG. 2. The switching frequency for the switching device 13, i.e. the second frequency mentioned above, can consequently be chosen optionally. More specifically it may be chosen such that it is proportional to the required output power, i.e. proportional to the power outputted from the output terminals of the switched-mode power supply 9. In this way it is namely possible that in the transformer 14 always the same maximum current values are obtained, independently of the power to be transferred by the switched-mode power supply 9, which is advantageous for the dimensioning of the transformer 14 and also for the elements connected thereto. It is also possible that the second frequency is modulated such via the half-waves of the rectified voltage at the terminals 4, 5, that is to say via the half-waves at the first frequency, that to suppress accompanying radio interference voltages a smaller mains filter is altogether required.

If this dimensioning of the circuit arrangement is chosen such, that the current IL through the first inductance 6 has already decayed up to the instant t2, the third rectifier device 27 may alternatively be omitted in an advantageous modification of the embodiment shown in FIG. 1.

In order to limit the maximum voltages occurring at the switching device 13, the voltage limiter stage shown by means of broken lines in FIG. 1 may be provided, which is then arranged in parallel with the switching device. This voltage limiter stage, alternatively denoted voltage clamp, comprises a parallel arrangement of an ohmic resistor 28 with a capacitor 30. This parallel arrangement is connected in series to a diode 29 arranged in the forward direction. Voltage limiter stages of this type are known per se, so that it is not necessary to explain their mode of operation.

I claim:

1. A circuit arrangement for producing an output direct voltage from significantly sinusoidal input a.c. voltage of a first frequency, comprising:

a first rectifier device, for receiving the significantly sinusoidal input a.c. voltage and for producing a direct voltage output;

a first inductance, a second rectifier device and a first filter capacitor, which form a series arrangement arranged in parallel with the direct voltage output;

a switched-mode power supply having two input terminals and arranged parallel to the first filter capacitor and between which there is a series arrangement including a second inductance and a switching device, the switching device, being controlled by a second frequency, for being switched to the conductive and the non-conductive state and from which the output direct voltage can be supplied; and a control capacitor, by means of which a junction point between the first inductance and the second rectifier device is linked to a junction point between the second inductance and the switching device, the first inductance and the control capacitor being rated such that a resonant frequency determined thereby exceeds the second frequency and the second frequency is chosen higher than the first frequency.

2. A circuit arrangement as claimed in claim 1, characterized in that, the second inductance is formed as the primary winding of a transformer, which transformer includes a secondary winding, and that the output direct voltage is derivable from the secondary winding.

3. A circuit arrangement as claimed in claim 2, characterized in that, the transformer is an autotransformer.

4. A circuit arrangement as claimed in claim 1, characterized in that, the second frequency can be set in proportion to the power supplied with the output direct voltage.

5. A circuit arrangement as claimed in claim 1, characterized in that, in the connection between the second rectifier device and the first filter capacitor on the one hand and the associated input terminal of the switched-mode power supply on the other hand, a third rectifier device is inserted with a direction of flow of the current corresponding to that of the second rectifier device.

6. A circuit arrangement as claimed in claim 1, characterized in that, the first inductance is rated so low that a current starting on switch-on of the switching device through the first inductance has already decayed again when it operates with a value for the second frequency to which this output power provided for supplying the output direct voltage can be adjusted.

7. A circuit arrangement as claimed in claim 1, characterized by a voltage limiter stage arranged parallel to the switching device.

* * * * *